United States Patent [19]

Williams et al.

[11] Patent Number: 5,781,908

[45] Date of Patent: Jul. 14, 1998

[54] FILE DATA SYNCHRONIZER IN A DISTRIBUTED DATA COMPUTER NETWORK

[75] Inventors: Thomas R. Williams, Littleton, Colo.; Charles J. Cape, Strongsville, Ohio; Richard T. Jackson, Castle Rock, Colo.

[73] Assignee: J.D. Edwards World Source Company, Denver, Colo.

[21] Appl. No.: 575,732

[22] Filed: Dec. 18, 1995

[51] Int. Cl.$^6$ ........................................... G06F 17/00

[52] U.S. Cl. ........................... 707/104; 707/203; 707/10

[58] Field of Search ........................... 395/601, 614; 340/825.02, 825.05; 380/4, 25, 30; 707/1–10, 100–104, 200–206

[56] References Cited

U.S. PATENT DOCUMENTS

| | | | |
|---|---|---|---|
| 4,007,450 | 2/1977 | Haibt et al. | 340/172.5 |
| 4,432,057 | 2/1984 | Daniell et al. | 364/300 |
| 4,887,204 | 12/1989 | Johnson et al. | 364/200 |
| 4,897,781 | 1/1990 | Chang et al. | 364/200 |
| 5,175,851 | 12/1992 | Johnson et al. | 395/600 |
| 5,218,713 | 6/1993 | Hammer et al. | 395/800 |
| 5,226,159 | 7/1993 | Henson et al. | 395/650 |
| 5,293,487 | 3/1994 | Russo et al. | 395/200 |
| 5,305,440 | 4/1994 | Morgan et al. | 395/200 |
| 5,331,315 | 7/1994 | Crosetto | 340/825.02 |
| 5,537,645 | 7/1996 | Henson et al. | 395/650 |

OTHER PUBLICATIONS

"Application System/400, System Concepts, Version 2", IBM Corp. publication GC41-9802-01, Second Edition (Jun. 1992), pp. 4–11 through 4–14.

Sidhu, Gursharan S., Andrews, Richard F., and Oppenheimer, Alan B., "Inside AppleTalk", Addison-Wesley Publishing Company, Inc., Mar. 1989, pp. 13–1 through 13–46.

*Primary Examiner*—Thomas G. Black
*Assistant Examiner*—David Yiuk Jung
*Attorney, Agent, or Firm*—James R. Young

[57] ABSTRACT

In a computer network comprised of multiple nodes spread across different geographic locations and connected through a communication system, a Distributed Data Synchronizer (DDS) synchronizes files across the network so that user applications running at the various nodes can share common databases of information. In a preferred embodiment, rather than store master files at a server node, each node stores a master copy locally in a disk drive. When a user application modifies one of the local files, the DDS communicates the update to the appropriate remote nodes under the control of a user defined script file.

25 Claims, 8 Drawing Sheets

DDS Scripts

Job Name...............ZJDE-AB002
Job Title..............Demo Address book - with pre-processing
Description............Send address book changes from JDED to JDEX
Collect Job History....Y

| SeqNumber | System Name | Script Verb | Type | Value | Type | Value |
|---|---|---|---|---|---|---|
| 10.00 | JDED | START | *PGM | P84INIT | | |
| 20.00 | JDEX | START | *PGM | P84INIT | | |
| 30.00 | JDED | READ | *JRN | F0101 | | |
| 40.00 | JDED | PROC | *PGM | P840101 | | |
| 50.00 | JDED | WRITE | *DCO | JDEX | | |
| 60.00 | JDEX | READ | *DTAO | F0101 Q | *DTAQ | F0101 Q |
| 70.00 | JDED | END | *PGM | P84CLOSE | | |
| 80.00 | JDEX | END | *PGM | P84CLOSE | | |

FIG. 5

DDS Job Status

| O P | Job Name | JobDescript | ReadCount | xfrCount | Date | Time | Cond. |
|---|---|---|---|---|---|---|---|
| | ZJDE-AB001 | Demo Address Book | 676 | 500 | 08/17/95 | 10:59am | Active |
| | ZJDE-AB002 | Demo Address Book | 345 | 563 | 09/02/95 | 01:00pm | Ended |
| | | | | | | | |
| | | | | | | | |
| | | | | | | | |
| | | | | | | | |
| | | | | | | | |
| | | | | | | | |

Opt: 7=Start    8=End

FIG. 6

```
/* Global */
FileDataRec *DataRec

ProcessList(ScriptList *List)
{
        ScriptRec *CurRec
        Integer i =0

CurRec = List->GetFirst
        While CurRec
        {
                Switch(CurRec.Command)
                {
                case START:
                        InterProcessCall(CurRec.Param1)
                        break case END:
                        InterProcessCall(CurRec.Param1)
                        break case READ:
                        DataRec = CurRec.Param1->ReadRecord
                        break case WRITE:
                        CurRec.Param1->WriteComm(DataRec, CurRec.Param2)
                        break case PROC:
                        InterProcessCall(CurRec.Param1, DataRec, CurRec.Param2)
                        break
                }

If CollectHistory
                        DetailFile->WRiteRecord(CurRec,i)
                i = i+1
                CurRec = List->GetNext
        }
}
```

FIG. 8

FILE DATA SYNCHRONIZER IN A DISTRIBUTED DATA COMPUTER NETWORK

FIELD OF THE INVENTION

The present invention relates to distributed data processing in a computer network, particularly to a distributed data synchronizer for synchronizing data file records across a plurality of network nodes.

BACKGROUND OF THE INVENTION

In a computer network comprised of multiple nodes spread across different geographic locations and connected through a communication system, it is often necessary for applications running concurrently across the nodes to share access to the same database of information. An accounting application, for example, running at various different nodes in the network may operate on the same data base such as a general ledger. An update to a record in the database at a local node must be synchronized or reflected to the other remote nodes in the system so that the applications running at the different nodes have access to the most recent data. The data itself is normally represented as a plurality of records in a file stored in a non-volatile storage device such as a disk drive. The goal then is to synchronize the content of these data files across the various nodes in the computer network.

One method of synchronizing file data across the network is to maintain a master file at a server node and send copies of the master file to client nodes. After operating on the copy of the file, the client node transfers the modified copy back to the server node where it is used to update the master file. This technique is most practical in environments where the client nodes do not need to update the master file on the server node or in environments where the amount of data to be copied is small and the data is updated infrequently. The advantage is that the application on the client node runs faster since it has immediate access to the copy of the master file stored locally. This technique is less practical, however, in environments where the client nodes need to update the master file on the server node, large amounts of data must be copied, and the data is updated frequently.

For applications where file copying is not practical, a more efficient method allows the client nodes to access the records directly from the master file through the network. This method has an advantage in that the client node operates on the actual, current data. Modifications to records by the client nodes are reflected immediately on the master file. However, direct access to the master file over the network is less desirable where the number of accesses is significant and the network latency slows operation of the client applications.

A widely used prior art technique for distributed data processing is described in "Distributed Data Management (DDM) User's Guide", August 1990, IBM, SC21-9600-2. The DDM system disclosed in this work supports both of the above techniques: copying a master file to a client node; and direct access to the master file over the network. In both methods, the user of the client node creates a DDM file which represents the master file stored at the server node. Applications running at the client node access the DDM file as though it were stored locally. A DDM driver also running on the client node intercepts the file access commands and performs the requested operations on the master file stored at the server node over the network.

To implement the above copy method of distributed data management, the user of a DDM system simply executes a copy file command, specifying the DDM file as the source file and a local file as the destination file. The DDM driver intercepts the copy command and copies the master file from the server node to the local file at the client node. The client node application then operates on the local file to avoid the latency associated with communicating over the network. At a predetermined interval (and usually at night) the local copy is transferred back to the server node and used to update the master file. After updating the master file, it is again transferred back to all the client nodes so that the client applications access the most recent data. As mentioned above, transferring entire files between the server and client nodes becomes prohibitively inefficient as the amount of data and number of nodes increase.

To decrease the amount of data transferred, the above direct access method of distributed data management can be implemented by executing read and write commands for records of the DDM file. The DDM driver intercepts the read and write commands and performs the operations on the master file stored on the server node over the network. As previously mentioned, directly accessing the master file over the network can slow operation of applications running on the client nodes, especially when the number of accesses to the database is significant.

In addition to streamlining the file transfer process, the present invention overcomes significant drawbacks associated with the prior art distributed data management techniques. Specifically, the prior art does not allow any user defined processing to occur as a part of the file transfer process. For example, the client node may want to transfer only those records that were modified, deleted or added to the local file in order to minimize the amount of data transferred to the server node. This requires temporary files and scrub routines in network systems using the prior art techniques of distributed data management.

Normally, modifications to database files are stored as records in a local log file (or journal file). In a DDM system using the direct access method, a scrub routine reads each record from the local log file and updates the DDM file (i.e., the master file) by writing each record over the network and waiting for an acknowledgment. If the DDM system uses the copy method, then the local copy of the log file is transferred to the server node and stored in a temporary file. A scrub routine running on the server node then reads each record from the temporary file and updates the master file. When the update is complete, the scrub routine deletes the temporary file.

The direct access and copy methods used in the prior art DDM systems are inefficient due to the communication latency and unnecessary number of data management steps. Consequently, the processing necessary for distributed data management can quickly saturate the data processor of the server node which maintains the integrity of the master database files for the entire network.

There is, therefore, a need for an improved apparatus and method for distributed data management across multiple nodes in a computer network system which allows user defined processing to occur concurrent with the file transfer process so that temporary files and scrub routines are obviated. Another aspect is to avoid using a server node for storing master copies of the database files, thereby alleviating the above mentioned saturation problem. A further aspect is to provide an integrated user interface to the distributed data management system to allow the user to specify how the file transfer will occur, including pre-processing and post-processing of data records, and batch transfers to multiple nodes.

SUMMARY OF THE INVENTION

In a computer network comprised of multiple nodes spread across different geographic locations and connected through a communication system, a Distributed Data Synchronizer (DDS) synchronizes files across the network so that user applications running at the various nodes can share common databases of information. In a preferred embodiment, rather than store master files at a server node, each node stores a master copy locally in a disk drive. When a user application modifies one of the local files, the DDS communicates the update to the appropriate remote nodes under the control of a user defined script file.

The script file contains multiple script records where each script record contains a command and optional parameters. The script commands, for example, might read a record from a journal file, process the journal record to extract an "after" image record, and transfer the "after" image record to the appropriate remote nodes. DDS programs running on the remote nodes receive the "after" image record and use it to update their local copies of the associated database files.

One of the script commands calls a user defined record processing procedure in order to pre or post process records as part of the synchronizing process. In the above example, a user defined procedure executes the step of extracting the "after" image from the journal record. Inter-process communications implements the call to user defined procedures in order to provide maximum user control over the synchronizing process without having to re-compile or re-link the DDS program.

The user configures the DDS program by creating and editing script files in a script editor. A status menu displays information related to the status of DDS jobs executing the script files. Multiple script files may execute concurrently to simultaneously synchronize a plurality of corresponding database files.

BRIEF DESCRIPTION OF THE DRAWINGS

The foregoing, and other features and objects of the present invention and the manner of attaining them will become more apparent, and the invention itself will be best understood by reference to the following description of a preferred embodiment taken in conjunction with the accompanying drawings, wherein:

FIG. 5 is a script editor menu for creating user defined data processing executed by the DDS;

FIG. 6 is a status menu for displaying status related to operation of the DDS jobs;

FIG. 8 is pseudo code depicting an implementation of the DDS.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Overview

Figure 1:
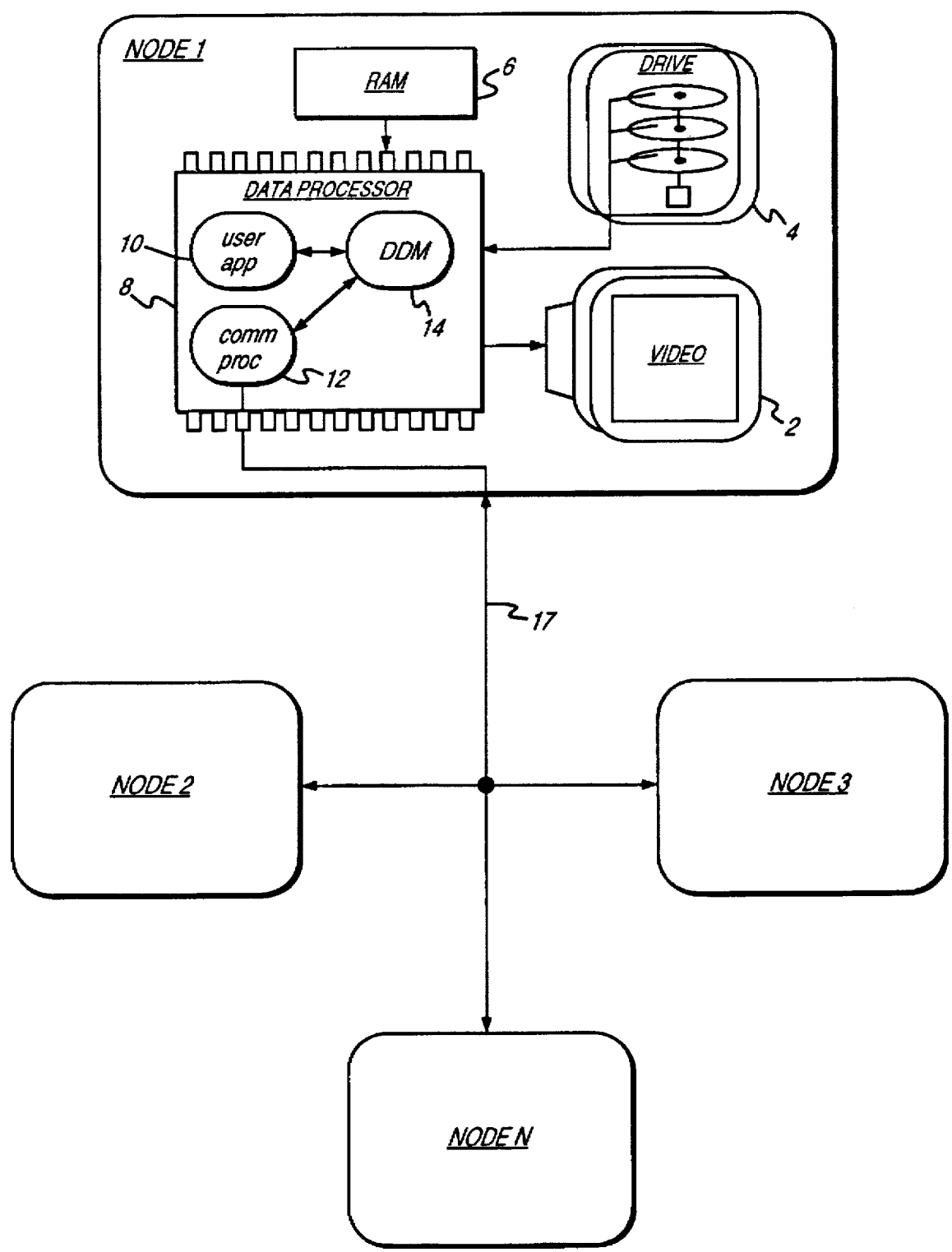
FIG. 1 shows a prior art method for implementing distributed data management over a computer network comprised of several nodes located at various geographic locations, wherein each node comprises a hard drive, a video monitor, random access memory, and a data processor for executing a prior art DDM program.

FIG. 1 shows a prior art implementation for distributed data management in a computer network 17 which may be a local area network or a wide are network. The network comprises a plurality of nodes connected by any sufficient means for data communications as is well known by those skilled in the art. Each node comprises a conventional video display 2 for user interface, a conventional disk drive 4 for storing data in the form of records of a file, conventional random access memory (RAM) 6, and a conventional data processor 8. The data processor 8 retrieves from RAM 6 and executes user applications 10, a standard network communication process 12, and a distributed data manager (DDM) 14. The conventional DDM 14 of FIG. 1 operates between the user applications 10 and the local disk drive 4 by intercepting user application calls to modify a file. If a file operation involves a remote file stored at a remote node, the DDM 14 carries out the requested operation using the communication process 12. The DDM 14 operates transparent to the user applications; that is, the user applications make standard file management calls as if the file was stored on the local hard drive 4. However, the conventional DDM 14 does not provide any user defined pre or post processing of records as part of the file transfer process.

Figure 2:
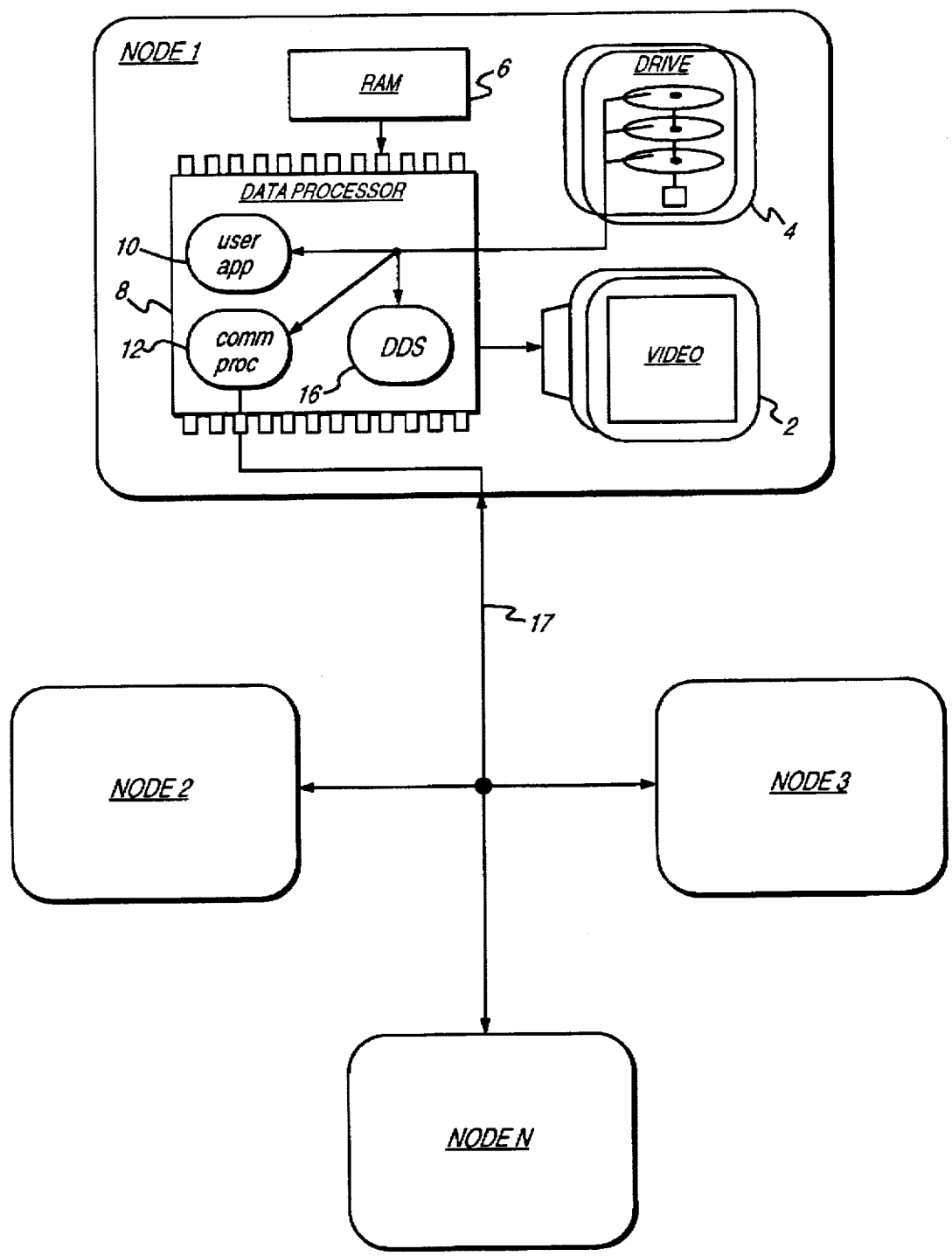
FIG. 2 shows the computer network executing the distributed data synchronizer (DDS) of the present invention.

FIG. 2 illustrates the distributed data synchronizer (DDS) 16 of the present invention operating in a computer network similar to FIG. 1 except that the DDS 16 does not intercept the user application calls to modify a file, and it allows user defined pre and post processing of records as an integrated part of the file synchronizing process. The DDS 16 is configured to continuously monitor files stored on the local disk drive 4 that may be updated by the user applications 10. If the status of a file changes because a user application modifies or adds a record to the file, the DDS 16 reads that record, performs user specified pre-processing, and transfers the record to a remote node over the network 17. When the remote node receives the record, the DDS 16 running on the remote node performs user specified post-processing and updates the corresponding file accordingly.

In this manner, the user applications 10 running at the various nodes in the network can share common databases of information. Furthermore, there is no server node for storing master copies of files. Instead, each node stores a master copy of the files that the node's user applications require. If a shared file is updated by a node, then the modified record is transferred from that node to the other remote nodes sharing the same file. The other nodes then use the modified record to update their master copy of the file. This implementation of distributed data management has the benefit of immediate access to local files and avoids saturating a server node with communication and file data processing.

Distributed Data Synchronizer

Figure 3:
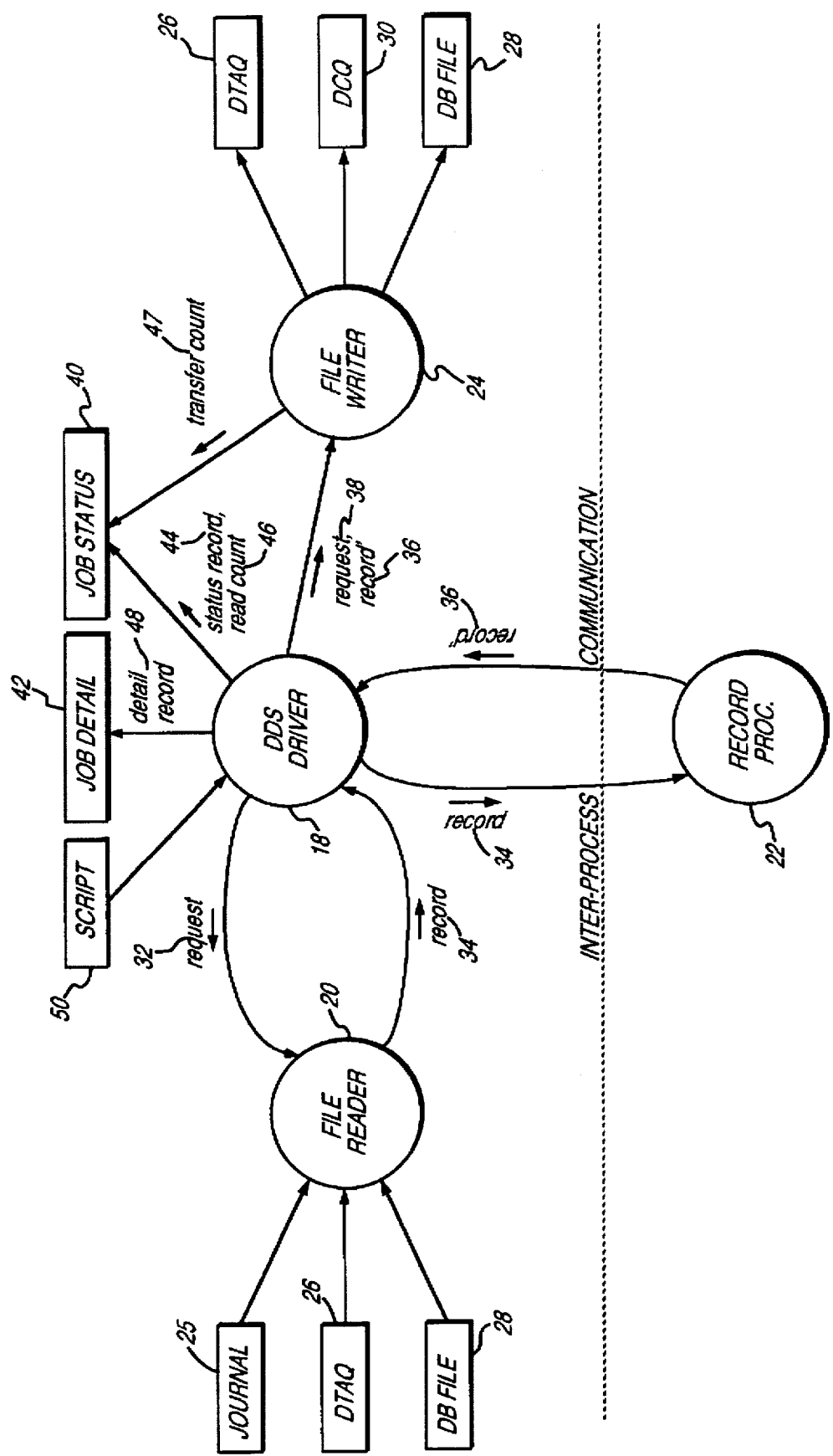
FIG. 3 illustrates a data flow diagram of the DDS.

Operation of the present invention is understood with reference now to FIG. 3 which shows a data flow diagram of the DDS 16. As shown in FIG. 3, the DDS 16 comprises a DDS driver 18, a file reader 20, a record processor 22, and a file writer 24.

The file reader 20 reads records from three types of files: journals 25, data queues (DTAQ) 26, and database files (DB FILE) 28. Journaling is a well known method for logging changes made to a database file by storing event records in a journal file. For example, a journal entry might contain a copy of a database record before and after being modified along with a system and program identifier to identify the system and program making the modification. Journal files provide an efficient method for monitoring modifications to database files and simplifying distributed data management as will be appreciated in the discussion that follows.

A data queue (DTAQ) 26 is a special type of file normally implemented as a first-in first-out (FIFO) queue of records. In network communications, for example, a data queue file temporarily stores records received from remote nodes until read by an application running on the local node. When an application reads a record, that record is immediately deleted from the data queue file. Data queue files provide an efficient and robust method for inter-process communications since the records are temporarily stored in the non-volatile storage device (i.e., the disk drive) until read by the receiving application.

The file writer 24 writes records to data queue files 26, data communication queue files 30, and data base files 28. A data communication queue file 30 is associated with the communication process responsible for transferring records to remote nodes. When the DDS 16 of the present invention needs to transfer an updated record to a remote node, the record is written to, and temporarily stored in, an appropriate data communication queue file 30 until transferred by the communications process 12 of FIG. 2 to a remote node.

In the preferred embodiment, the DDS 16 is implemented as a device driver which runs continuously along with user applications or during user specified intervals (e.g., at night). The DDS driver 18 continuously sends read requests 32 to the file reader 20 which returns records 34 modified or added by the user applications 10. When a record 34 is returned from the file reader 20, the DDS driver 18 passes it to a user defined record processor 22 for pre-processing according to a user defined criteria. The record processor 22 returns a modified record 36 to the DDS driver 18 for transfer to a user specified remote node. The record processor 22 might determine that the record should be excluded from the synchronization process. In this instance, the record processor 22 will return a NULL record 36 so that nothing is transferred.

To transfer the modified record 36 to a remote node, the DDS driver 18 sends a write request 38 and the modified record 36 to the file writer 24. The write request 38 comprises the name of a data communication queue file (DCQ) 30 associated with a remote node and a name of a destination data queue file (DTAQ) 26 for storing the modified record when received. The file writer 24 writes the modified record 36 to the data communication queue file (DCQ) 30 so that the communication process 12 can retrieve and transfers it to the remote node.

When the record is received, a DDS 16 running on the remote node reads the record 34 from the destination data queue file (DTAQ) 26 using the file reader 20 as previously described, performs user defined post-processing 22 of the record 34, and updates the appropriate database file 28 accordingly.

As an example illustrating the utility of the present invention, consider an address book database file containing address records for a particular group of people where modifications to the address book can be made by user applications running at various nodes across the network. When an update to the address book is made at a given node, an event record is written to a corresponding journal file to log the modification. The journal event record contains a "before" and "after" image of the updated record along with the system and program name making the modification. This modification to the address book needs to be reflected in the address book files stored at the remote nodes of the network.

The DDS 16 effectuates the global update to the address book files across the network by performing the following steps:

(1) reading 20 the local journal event record 34;
(2) pre-processing 22 the event record 34 to extract an "after" image record and program name that made the modification and storing this information in a source record 36;
(3) writing the source record 36 to a data communication queue file (DCQ) 30 associated with a remote node so that the communication process 12 will transfer the source record 34 to the remote node where it is stored in a user specified destination data queue (DTAQ) 26;
(4) reading the source record 34 from the destination data queue (DTAQ) 26 at the remote node; and
(5) post-processing 22 the source record 34 to update the address book of the remote node.

Notice that the last step, updating the address book of the remote node, will generate a journal event at the remote node. This will cause the DDS 16 of the remote node to initiate the same synchronization process resulting in an infinite synchronization loop between the nodes. To avoid this problem, the user defined pre-processing of step (2) looks at the program name that made the modification to the address book file. If the name of the modifying program is the DDS 16 program, then the after image record is not transferred to the remote nodes.

As the DDS 16 of the present invention executes the distributed data management process as described above, it periodically updates two files: a job status file 40 and a job detail file 42. The DDS 16 writes a status record 44 to the job status file 40 to provide the end user with information related to its operation: whether it is running or terminated; the number of records read 46 by the file reader 20; and the number of records transferred 47 by the communication process 12. The DDS 16 also writes a detail record 48 to the job detail file 42 every time it executes a step in the process (i.e., a script command described below). The detail record 48 comprises information related to a current execution step including the current function called and parameters passed. This information can then be used to troubleshoot problems associated with running the DDS 16.

Unlike prior art implementations of distributed data management, in the present invention the user exercises complete control over the process by programming the DDS 16 with user defined scripts. The DDS 16 reads a user created script file 50 and executes the script commands contained therein. A user interface of the present invention provides a script editor which allows the user to create and edit the DDS script files 50 as described in the section that follows.

User Interface

Figure 4:
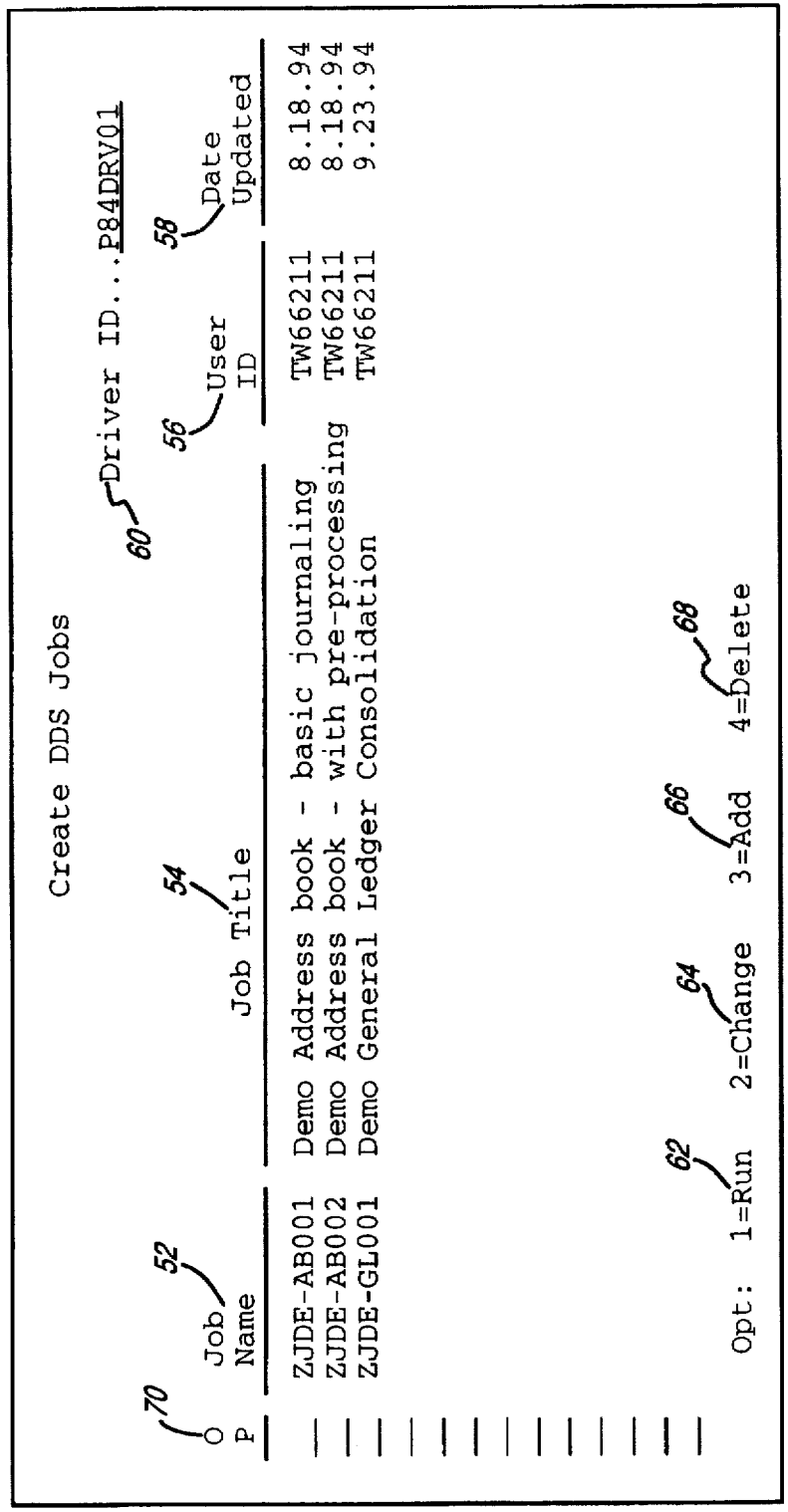
FIG. 4 shows a menu for creating DDS jobs to handle file data transfer between the nodes of the network.

FIG. 4 shows the user interface of the present invention for creating, editing, and running DDS jobs. A DDS job comprises: a Job Name 52 which identifies an associated script file; a Job Title 54 which describes the job; a User ID 56 and an Update Date 58 for system administration. A Driver ID 60 field identifies the name of the DDS 16 program executed by the operating system when a job is started. There may be several user defined DDS jobs running concurrently (i.e., several copies of the DDS 16 program executing an associated script file) where each job is responsible for synchronizing a particular file across the network.

The available user options listed at the bottom of the menu in FIG. 4 include: running a job 62; editing a job script file 64; creating a new job (i.e., a new script file) 66; and deleting an existing job 68. To execute an option, the user enters a corresponding number in an OP field 70 located at the left side of the Job Name 52. To create a new job, the user enters a 3 in the OP field 70 at an empty line in order to display the DDS script editor as shown in FIG. 5.

Once in the script editor of FIG. 5, the user enters a Job Name 72, a Job Title 74, a brief Description 76, and whether the DDS will collect the job history 78 (i.e., save detail records 48 in the job detail file 42). Each record of the script file contains:

(a) a Sequence Number 80 which identifies the order of execution;
(b) a System Name 82 which identifies the data processor 8 that will execute the script command;
(c) a Script Verb 84 which identifies the function executed;
(d) a first and second Type parameter 86,88 which identify an object type associated with the Script Verb 84; and
(e) a first and second Value parameter 90,92 which identify an object value associated with the Script Verb 84.

The user edits a script record by typing over entries in a field or creates a new script record by filling in the fields of a blank line.

The following is a description of the Script Verbs 84 available to the user:

START accepts a first Type 86 of *PGM and the name of a user initialization procedure for a first Value 90. The START verb executes the user procedure at the start of the job in order to initialize the DDS program 16. There can be zero to many START statements in a script.

READ accepts a first Type 86 of *JRN, *DTAQ or *DCQ file and the name of a file for a first Value 90. The READ verb reads a record from the specified file if a record is available. There can only be one READ statement in a script.

WRITE accepts a first Type 86 of *JRN, *DTAQ or *DCQ file and the name of a file for a first Value 90. If the first Type 86 is *JRN or *DTAQ, then the second Type 88 and second Value 92 are blank and WRITE verb simply writes the current record to the specified file. If the first Type 86 is a *DCQ (data communication queue), then the second Type 88 is a *DTAQ and the second Value 92 specifies the name of the destination data queue. The WRITE verb writes the current file to the specified data communication queue and, when received by the remote node, the record is stored in the specified data queue. There must be one, and there may be many WRITE statements in a script.

PROC accepts a first Type 86 of *PGM and the name of a user defined record processing procedure 22 (FIG. 2) for a first Value 90. The PROC verb calls the specified record processing procedure 22 and passes the current record as a parameter. There can be zero to many PROC statements in a script.

END accepts a first Type 86 of *PGM and the name of a user termination procedure for a first Value 90. The END verb calls the user termination procedure when the job is ended. There can be zero to many END statements in a script.

The example DDS Job of FIG. 5 sends changes to a local address book file from a node named JDED to a node named JDEX. Notice that the script contains all of the commands necessary for both the JDED node and the JDEX node to carry out the file update. Both nodes run the same job and execute the same script file, but each node only executes those records with a System Name 82 matching the node's name. For example, the JDEX node would execute the records with the sequence numbers 20, 60, and 80. Storing the script commands executed by both nodes in one file simplifies writing the script and reduces the number of programming errors.

When the job of FIG. 5 is started by the user, the DDS calls a user defined program P84INIT at both nodes to initialize the DDS process. Changes to the address book are stored in a journal file (*JRN) named F0101 in the local disk drive connected to node JDED. The DDS executing on the JDED node reads a journal record and passes it to a user defined pre record processor P840101 which extracts the "after" image from the journal record and returns it in a modified record. Then the DDS writes the modified record to a data communications queue (*DCQ) named JDEX and specifies a data queue F0101_O for storing the modified record when received by the JDEX node. The DDS running on the JDEX node reads the modified record from the data queue F0101_O and transfer it to a user defined post record processor P840102 which updates the copy of the address book stored at the JDEX node. When the user terminates the job, the DDS running at both nodes executes a user defined END program P84CLOSE to conclude the DDS file transfer.

The START and END script commands are executed once at the beginning and end of the job, respectively. The commands between the START and END are executed continuously in a loop until the user terminates the job. If the end of the journal file is reached, then the DDS simply waits for further journal records to be added. If the Collect Job History flag is set to Y (yes), then at each step in the execution sequence a detail record 48 is written to the job detail file 42. A job status record 44 is also periodically written to the job status file 40 to provide the user with information related to the job.

The DDS job of FIG. 5 illustrates how to transfer updates to an address book file stored at node JDED to an address book file stored at node JDEX. Batch transfer to multiple nodes is accomplished by duplicating the script commands for each remote node. This allows the user to control which nodes receive updates, thereby dividing the network into customized subgroups according to the needs of the user.

FIG. 6 is a job status menu displayed to the user which contains the job status information. Included in the job status is a list of the Job Names 94, Job Descriptions 96, Read Count 98, Transfer (Xfr) Count 100, Date 102 and Time 104, and a Condition 106 (Active or Terminated). The user enters a number in an OP field 108 to start or end a corresponding job. The Read Count 98 displays the number of records READ by the job since the job started, and the Xfr Count 100 contains the number of records successfully transferred to the remote nodes. The Date 102 and Time 104 fields contain the date and time the job was started if the job is Active, and if Terminated, the date and time the job was ended by the user.

Script Processing

Figure 7:
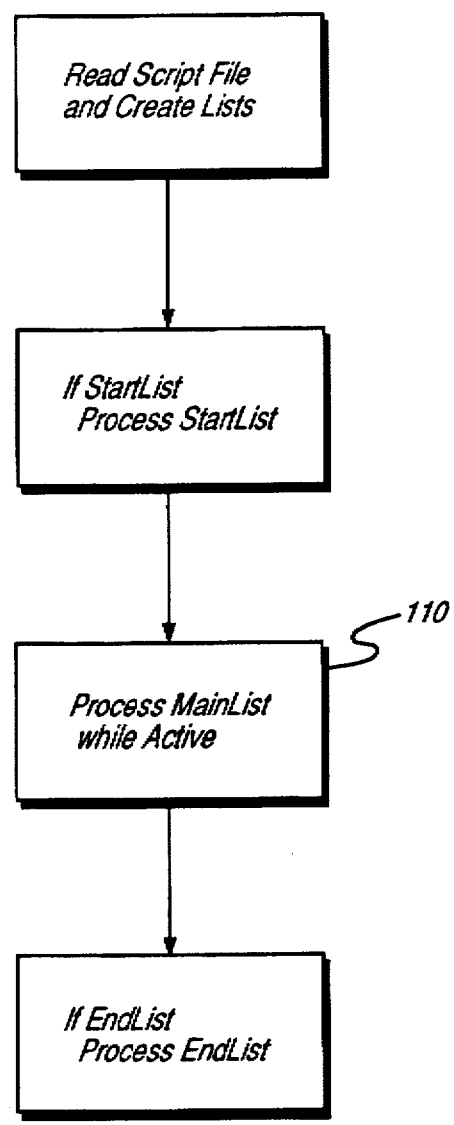
FIG. 7 illustrates an execution flow diagram of the DDS.

Referring now to FIG. 7, shown is an execution flow chart for the DDS 16 program according to the present invention. When the user starts a DDS job, the DDS driver 18 reads the corresponding script file 50 and generates a StartList, MainList, and EndList of script records. The StartList contains the above START commands, the EndList contains the above END commands, and the MainList contains the remaining script commands in-between. Each list contains only those commands where the node name matches the System Name 82 stored in the script record. In the example script file of FIG. 5, the script lists generated by the DDS 16 running on the JDED node will contain only those commands where the System Name 82 is JDED.

To initialize the DDS 16 program, the DDS driver 18 executes the START commands stored in the StartList. Each START command has an associated user defined procedure called by the DDS driver 18. Once initialized, the DDS driver 18 executes the script commands stored in the MainList in a continuous loop until the user ends the job. When ended, the DDS driver 18 executes the END commands stored in the EndList. Each END command has an associated user defined procedure called by the DDS driver 18.

Continuing now to FIG. 8, shown is pseudo code executed by the DDS driver 18 to process a script list. The ScriptList input parameter is selected from StartList, MainList, or EndList. A global variable FileDataRec *DataRec stores a record read from a file. A local variable ScriptRec *CurRec stores a current script record, a local variable FileDataRec *DataRec stores a file record, and a local variable Integer i stores a record count. The CurRec is initialized with the first record in the list and its corresponding Verb 84 command is executed.

If the Verb 84 is START or END, then the user procedure stored in the first Value 90 of the script record (CurRec.Param1) is executed by an inter-process call. As is well understood by those skilled in the art, the DDS 16 running as an independent program makes an inter-process communication call to the user procedure 22 also running as an independent program. Inter-process communications provides maximum flexibility since the user can specify any user procedure in the script file without having to re-compile and link the DDS 16 program.

If the Verb 84 is READ, then the File Reader 20 reads a record 34 from the file specified in the first Value 90 of the script record (CurRec.Param1). The record is stored in the global variable DataRec. If the Verb 84 is WRITE, then the record stored in DataRec is written to the file specified in the first Value 90 of the script record (CurRec.Param1). If writing to a data communications queue (DCQ), then the second Value 92 of the script record (CurRec.Param2), which stores the name of the destination data queue at the remote node, is passed as the second parameter to the WriteRecord method.

If the Verb 84 is PROC, then the user defined record procedure 22 stored in the first Value 90 of the script record (CurRec.Param1) is executed by an inter-process call. Again, calling the record processor 22 using inter-process communications allows the user to modify operation of the DDS program without having to re-compile and re-link. The record processor 22 processes the file record stored in DataRec and returns a modified record 36. A NULL record returned by the record processor 22 indicates that the user intends to omit the record from the synchronizing process.

After processing the current script record, if the CollectHistory flag has been set by the user, the script record CurRec is written to the job detail file 42. The record counter i is incremented, and the next script record is read from the list and stored in CurRec. If CurRec is NULL indicating that the end of the list has been reached, then control is returned to the main method 110 of FIG. 7 which continues to process the MainList until the user terminates the job. When the job is terminated, the DDS driver 18 processes the EndList, i.e., it calls all of the user defined termination procedures associated with the END commands in the script file.

Having described a preferred embodiment of the present invention, those skilled in the art will recognize that many changes in form and details and widely differing embodiments and applications of the invention will suggest themselves without departing from the scope of the present invention, as defined by the following claims. The disclosures and the description herein are intended to be illustrative and are not in any sense limiting of the invention, as defined in scope by the following claims.

What is claimed is:

1. In a distributed data computer network system comprised of multiple nodes and interconnected for file data communications wherein each node has a data processor connected to a non-volatile storage device for storing file data and further connected to a random access memory for storing and executing user applications, a distributed data synchronizer for synchronizing the file data across the multiple nodes comprising:
   (a) an application program executing within a first process of a local node, wherein the application program creates at least one local data record;
   (b) a file data reader, executing within a second process of the local node, for reading the at least one local data record;
   (c) a local data record process, responsive to each local data record read in step (b), for processing each local data record read in step (b) according to a first user defined criteria to generate a modified local data record for each local data record read in step (b);
   (d) an output process interfaced to a communication process for transferring each modified local data record generated in step (c) to a remote data processor of a remote node;
   (e) a remote input process, executing within the remote node and interfaced to a communication process in the remote node for receiving each data record transferred in step (d);
   (f) a remote data record process, responsive to each remote data record received in step (e), for processing each remote data record received in step (e) according to a second user defined criteria to generate a modified remote data record for each remote data record received in step (e); and
   (g) a file data writer for writing each modified remote data record generated in step (f) to the remote node.

2. The distributed data synchronizer as recited in claim 1, wherein the local data record process is called through an inter-process communication system.

3. The distributed data synchronizer as recited in claim 1, wherein the remote data record process is called through an inter-process communication system.

4. The distributed data synchronizer as recited in claim 1, wherein:
   (a) the local data record process generates an omit indicator for indicating that the local data record should be omitted; and
   (b) if the omit indicator is active, then the modified local data record is not transferred to the remote data process of the remote node.

5. The distributed data synchronizer as recited in claim 1, wherein:
   (a) the remote data record process generates an omit indicator for indicating that the remote data record should be omitted; and
   (b) if the omit indicator is active, then the modified remote data record is not written to the remote node.

6. The distributed data synchronizer as recited in claim 1, further comprising a job status writer for periodically writing a job status record to a job status file, the job status record comprising information on the status of the distributed data synchronizer.

7. The distributed data synchronizer as recited in claim 1, further comprising a job detail writer for writing a job detail record to a job detail file, wherein:
(a) the job detail record is written concurrent with an execution step of the distributed data synchronizer; and
(b) the job detail record contains information related to the execution step.

8. The distributed data synchronizer as recited in claim 6, further comprising a job status displayer for reading the job status record from the job status file and displaying the job status record on a computer screen connected to the local data processor.

9. The distributed data synchronizer as recited in claim 1, further comprising a script process for processing a user generated script file stored in the local node.

10. The distributed data synchronizer as recited in claim 9, wherein:
(a) the script file comprises a plurality of execution records;
(b) each execution record comprises a command and at least one parameter associated with the command;
(c) the command selected from the group consisting of reading the local data record from the source file, executing the local data record processor and outputting the modified local data record to the communication process; and
(d) the parameter selected from the group consisting of a source file name of the source file, a data record processor name of the local data record processor and a remote node name of the remote node.

11. The distributed data synchronizer as recited in claim 10, wherein:
(a) the remote node further comprises a script process;
(b) the script process within the remote node processes a copy of the user generated script file;
(c) each execution record within the user generated script file contains a system identifier which identifies a target node that will execute the execution record; and
(d) the execution record is executed only if the system identifier matches the corresponding node running the distributed data synchronizer.

12. The distributed data synchronizer as recited in claim 1, wherein the modified local data record is transferred to a plurality of remote data processors of a plurality of remote nodes.

13. In a distributed data computer network system comprised of multiple nodes and interconnected for file data communications wherein each node has a data processor connected to a non-volatile storage device for storing file data and further connected to a random access memory for storing and executing user applications, a distributed data synchronizing method for synchronizing the file data across the multiple nodes comprising the steps of:
(a) creating a local data record within a first process of the local node;
(b) reading, within a second process of the local node, the local data record created in step (a);
(c) processing the local data record according to a first user defined criteria to generate a modified local data record;
(d) transferring the modified local data record to a remote data process of a remote node.
(e) receiving, within the remote node, the data record transferred in step (d);
(f) processing, within the remote node, the data record received in step (e) according to a second user defined criteria to generate a modified remote data record; and
(g) writing the modified remote data record to the remote node.

14. The distributed data synchronizing method as recited in claim 13, wherein the distributed data synchronizing method executes the step of processing the local data record through an inter-process communication system.

15. The distributed data synchronizing method as recited in claim 13, wherein the distributed data synchronizing method executes the step of processing the remote data record through an inter-process communication system.

16. The distributed data synchronizing method as recited in claim 13, wherein:
(a) the local data record process generates an omit indicator for indicating that the local data record should be omitted from the synchronizing process; and
(b) if the omit indicator is active, then the modified local data record is not transferred to the remote data processor of the remote node.

17. The distributed data synchronizing method as recited in claim 13, wherein:
(a) the step of processing the remote data record generates an omit indicator for indicating that the remote data record should be omitted from the synchronizing process; and
(b) if the omit indicator is active, then the modified remote data record is not written to the remote node.

18. The distributed data synchronizing method as recited in claim 13, further comprising the step of periodically writing a job status record to a job status file, the job status record comprising information on the status of the distributed data synchronizing method.

19. The distributed data synchronizing method as recited in claim 13, further comprising the step of writing a job detail record to a job detail file, wherein:
(a) the job detail record is written concurrent with an execution step of the distributed data synchronizing method; and
(b) the job detail record contains information related to the execution step.

20. The distributed data synchronizing method as recited in claim 19, further comprising the steps of:
(a) reading the job status record from the job status file; and
(b) displaying the job status record on a computer screen connected to the local data processor.

21. The distributed data synchronizing method as recited in claim 13, further comprising the step of processing a user generated script file stored in the local node.

22. The distributed data synchronizing method as recited in claim 21, wherein:
(a) the script file comprises a plurality of execution records;
(b) each execution record comprises a command and at least one parameter associated with the command;
(c) the command selected from the group consisting of reading the local data record from the source file, executing the local data record processor and outputting the modified local data record to the communication process; and
(d) the parameter selected from the group consisting of a source file name of the source file, a data record processor name of the local data record processor and a remote node name of the remote node.

23. The distributed data synchronizing method as recited in claim 13, further comprising the steps of:
(a) copying the user generated script file to the remote node;
(b) performing both the user generated script file in the local node concurrently with performing the copy of the user generated script file in the remote node;
(c) associating a system identifier with each execution record which identifies a target node that will execute the execution record; and
(d) executing the execution record only if the system identifier matches the corresponding node running the distributed data synchronizer.

24. The distributed data synchronizing method as recited in claim 13, further comprising the step of transferring the modified local data record to a plurality of remote data processors of a plurality of remote nodes.

25. The distributed data synchronizing method as recited in claim 13, wherein the steps comprised therein are executed continuously in order to monitor the source file and to transfer records stored in the source file to the remote nodes whenever the source file is modified by the user applications.

* * * * *